United States Patent [19]
Abbey

[11] Patent Number: 4,608,423
[45] Date of Patent: Aug. 26, 1986

[54] LINEAR ADDITION POLYESTER COPOLYMERS

[75] Inventor: Kirk J. Abbey, Seville, Ohio

[73] Assignee: SCM Corporation, New York, N.Y.

[21] Appl. No.: 822,334

[22] Filed: Jan. 27, 1986

Related U.S. Application Data

[63] Continuation-in-part of Ser. No. 749,310, Jun. 20, 1985, abandoned.

[51] Int. Cl.$^4$ ............................................. C08F 4/06
[52] U.S. Cl. .................................. 526/172; 526/323.1
[58] Field of Search .................... 526/171, 172, 323.1, 526/147, 141, 142, 135

[56] References Cited

U.S. PATENT DOCUMENTS 4,331,795 5/1982 Ukita .................................... 526/147
4,526,945 7/1985 Carlson ................................ 526/172

Primary Examiner—Paul R. Michl
Attorney, Agent, or Firm—A. Joseph Gibbons; Thomas M. Schmitz

[57] ABSTRACT

Dimethacrylate esters of a diol are linearly copolymerized by step dimerization of methacrylate groups of a dimethacrylate ester in the presence of a non-peroxide free radical initiator and a Cobalt (II) catalyst complex for chain transfer to monomer to produce a linear polyester polymer having 2,2-dimethyl-4-methylene glutarate structural units in the polymer chain.

13 Claims, No Drawings

LINEAR ADDITION POLYESTER COPOLYMERS

This application is a continuation-in-part application of copending application Ser. No. 749,310 filed June 20, 1985, abandoned.

This invention pertains to linear free radical polymerization or copolymerization of dimethacrylate esters in the presence of a cobalt II catalyst to produce an essentially linear poly(2,2-dimethy-4-methylene glutarate)-polymer containing terminal methacrylate groups as well as pendent unsaturated double bonds. The copolymers are useful as binders in surface protective coating compositions.

In commonly assigned Ser. No. 591,803 filed Mar. 21, 1984, now U.S. Pat. No. 4,547,323, a method was disclosed for dimerizing methacrylate monomers in the presence of a cobalt II complex to give a low molecular weight 2,2-dimethyl-4-methylene glutaric acid derivative.

Commonly assigned U.S. Pat. No. 4,526,945 teaches the preparation of lower molecular weight methacrylic polymer using free radical/Cobalt (II) glyoxime catalysts.

This invention pertains to soluble polyesters arising from either the catalyzed free radical dimerization of dimethacrylate esters or the controlled oligomerization of dimethacrylate esters with vinyl aromatic compounds. The dimerization reaction is a free radical reaction of methacrylic moieties in the presence of a cobalt II catalyst as was disclosed in commonly assigned U.S. Pat. No. 4,547,323 filed Mar. 21, 1984. The controlled oligomerization is likewise a result of the chain transfer catalytic activity and selectivity of the cobalt II catalyst as will be described herein below.

Polyesters are generally synthesized by the condensation of a dicarboxylic acid and a diol with removal of water. Other acid derivatives may be substituted, such as diesters or diacid chlorides with removal of alcohol or hydrogen chloride, respectively. Non-condensation routes to produce polyesters include ring-opening polymerization of lactones and addition of an acid moiety across an oxirane utilizing both difunctional acids and difunctional oxirane compounds. A relatively recent route to particular polyesters has been devised that involves a free radical chain reaction with 2-methylene-1,3-dioxolane moieties as substrate. (Bailey and Endo in "Ring-Opening Polymerization," Eds. K. J. Irin and T. Saegusa, Elsevier Applied Science Pb. 1984).

Current techniques for controlling molecular weights of free radically polymerized methacrylic polymers involve the addition of chain transfer agents, such as mercaptans, to the polymerization media. The occurrence of chain transfer to the chain transfer agent results in decreased molecular weight of the polymer formed. However, the addition of chain transfer agents can cause several problems including consumption of the chain transfer agent resulting in broad molecular weight distributions, odor problems related to the chain transfer agent and increased cost of the final product due to the chain transfer agent. A recent publication (Enikolopyan et al., J. Poly. Sci., Polym. Chem. Ed., 19, 819 1981), described the use of cobalt porphyrin complexes as catalysts for chain transfer to monomer. Each porphyrin molecule causes up to 2,000 transfer reactions compared to chain transfer agents which typically are active in only one transfer reaction. A recent journal article, Acc. Chem. Res 16, 343 (1983) discloses the use of cobalt dimethylglyoxime complexes as catalyst in free radical reactions although polymerization reactions are not disclosed.

It now has been found that a dimethacrylate ester comprising a dimethacrylate ester of a diol can be linearly copolymerized by step growth, dimerization of the methacrylate moieties of the dimethacrylate ester in the presence of cobalt II complex catalyst without causing undesirable three-dimensional cross-linking. The dimethacrylate ester contains two unsaturated double bonds wherein each bond of the dimethacrylate ester molecule reacts individually with a single double bond on another difunctional methacrylate ester unit or sequentially with one or more vinyl aromatic moieties and then a second methacrylate ester followed by a chain transfer step to provide a linear non-crosslinked polymer. The linear methacrylate-polyester polymers advantageously provide a unique hydrolysis resistant, noncrystalline polymer particularly suitable for use in air dry coating compositions. The terminal and pendant unsaturation in the linear polymer provides a cure site for air-dry oxidation cure or alternatively a thermoset cure by crosslinking the double bonds with ethylenically unsaturated monomer such as styrene. The ester linkages in the polymer are sterically hindered and exhibit good hydrolysis resistance. The dissymmetry of the linear polymer molecule prevents crystallization of the polymer structure. The cobalt II metal catalyzed chain transfer agents necessary to produce linear poly(2,2-dimethyl-4-methylene glutarate)polymers in accordance with this invention advantageously work with methacrylate monomers but do not work with acrylate monomers which quite often have been noted to inhibit the metal catalyst. These and other advantages of this invention will become more apparent by referring to the detailed description and the illustrative examples.

SUMMARY OF THE INVENTION

Briefly, the invention pertains to linear poly(glutarate)polymer containing terminal and pendant double bond unsaturation produced by step growth dimerization of dimethacrylate ester at a diol or polyol in the presence of an azo free radical initiator in conjunction with at least about 0.01% by weight of a cobalt II complex catalyst to produce a substantially non-crosslinked linear poly(glutarate)polymer.

One aspect of this invention is a process for preparing non-crosslinked polyester polymer having 2,2-dimethyl-4-methylene glutarate structural units in the polymer chain and a weight average molecular weight above about 2,000 which comprises (a) providing a dimethacrylate ester of the formula:

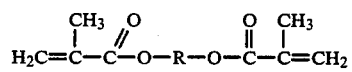

wherein R is selected from the group consisting of an aliphatic chain containing between two and thirty carbon atoms; an aliphatic polyether residue containing between two and thirty carbon atoms; a diepoxide residue; and a low molecular weight hydroxyl terminated polyester residue (b) polymerizing said dimethacrylate ester in the presence of at least 0.1% non-peroxide free radical initiator and in the presence of at least 0.01% Cobalt (II) catalyst complex for chain transfer to monomer.

A further aspect relates to coatings prepared from the above-described polymers.

DETAILED DESCRIPTION OF THE INVENTION

The process of this invention comprises polymerizing difunctional monomer such as dimethacrylate ester of a diol in the presence of Cobalt II and an azo initiator to produce a linear poly(glutarate)polyester.

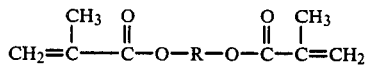
(A)

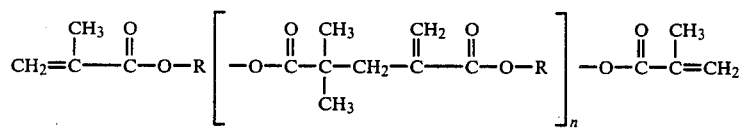
(B)

Applicant's polymer "B" differs considerably from the products shown in U.S. Pat. No. 4,526,945 both in structure and properties. "B" contains hindered ester linkages along the polymer chain which is essentially linear in nature. The ester functionalities are structurally hindered in the one case by 2,2-dimethyl substitution and by 2-methylene substitution. It is recognized that structure "B" is a generalized formula only.

The starting component "A" comprises a diester of methacrylic acid.

In the above structure, R is an aliphatic chain containing between two and thirty carbon atoms; or an ether aliphatic chain containing between two and thirty carbon atoms; or an oligomeric polyester with a number average molecular weight of about 200 to about 1500; or the residue resulting from the reaction of two moles of methacrylic acid with a mole of diepoxide compound such that ring opening addition occurs. Dimethacrylic esters of a diol are commercially available or can be produced by esterifying excess amounts of a methacrylic acid with a diol. The addition of methacrylic acid to dioxirane compounds, which are in turn readily available commercially, yields a dimethacrylate ester compound bearing free hydroxyl moieties.

The dimethacrylate can comprise two molecules of a methacrylate acid monomer esterified with one molecule of a diol or more commonly called a glycol. The methacrylic acid can be esterified with glycol at esterification temperatures above about 150° C. and preferably between about 175° C. and 225° C. Suitable diols or glycols can include for example ethylene glycol, diethylene glycol, propylene glycol, dipropylene glycol, 1,3 or 1,4-buylene glycol, hexylene glycols, neopentyl glycol, cyclohexane dimethanol, as well as trimethylene or tripropylene glycols.

The diol can also be a hydroxyl terminated polyester prepared from simple diacids and the above simple glycols prepared by conversional condensation polymerizations. The diacids can include adipic, phthalic, isophthalic, terephthalic, 1,4-cyclohexane dicarboxylate and the like.

The methacrylic acid can also be converted into a dimethacrylate by the addition reaction of the acid to dioxirane compounds, preferably in the presence of suitable catalysts such as tertiary amines. Dioxirane compounds that can be used are diglycidyl ethers of bisphenol A, diglycidyl ethers of 1,4-butanediol, alpha, omega-aliphatic diepoxides, terpene diepoxides and the like. The resulting ester is a dimethacrylate ester with pendant hydroxyl moieties which can be free-radical addition copolymerized in accordance with this invention to produce a linear glutarate polyester copolymers containing terminal and pendant unsaturation. These polyesters also contain pendant hydroxyl moieties unattainable by direct condensation reactions.

The linear polyester polymer structure can be prepared by free radical polymerization. A simple polymer structure can comprise a poly-(2,2-dimethyl-4-methylene glutarate-co-glycol) with terminal methacrylate groups. For example, a polyester can be prepared from a dimethacrylate ester of the general structure.

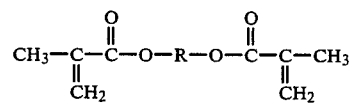

A mixture of dimethacrylate esters with different R groups can similarly be utilized to modify polymer properties such as flexibility, hardness, weatherability and the like as may be desired.

The polymer backbone can also be modified by the incorporation of vinyl aromatic hydrocarbons to yield a more general polyester structure. The vinyl aromatic hydrocarbons may include styrene, methyl styrene and similar lower alkyl styrenes, chlorostyrene, vinyl naphthalene and the like. The amount of vinyl aromatic that can advantageously be utilized is from 0 moles per mole of dimethacrylate ester to about 5 moles per mole of dimethacrylate ester. Most preferred is less than about 2 moles of vinyl aromatic per mole of dimethacrylate.

The use of monofunctional methacrylic monomers as initial coreactants limit the molecular weight development of the polyesters of this invention as well as change the terminating moieties of the linear polyester polymer. The methacrylate monomers can advantageously be used in a second-stage process to modify the methacryoyl moities that remain after most of the growth polymerization is completed. Thus, a multi-step polymerization comprises (1) a first-stage wherein the reactants are predominantly dimethacrylate ester with 0 to 5 moles vinyl monomer per mole of dimethacrylate ester followed by (2) a second-stage polymerization wherein the reactive monomers are methacrylic acid, methacrylic acid esters, methacrylamides and methacrylontrile.

Functional monomers include carboxyl, hydroxyl, nitrile, amino, and amide functional group containing monomers. The methacrylic monomers include monomers such as lower alkyl esters of methacrylic acid having an alkyl ester portion containing between 1 and 12 carbon atoms as well as aromatic derivatives of methacrylic acid. Useful methacrylic monomers include, for example, methacrylic acid, ethyl methacrylate, butyl methacrylate, propyl methacrylate, 2-ethyl hexyl methacrylate, cycolhexyl methacrylate, decyl methacrylate, isodecyl methacrylate, benzyl methacrylate, and various reaction products such as butyl, phenyl, and cresyl glycidyl ethers reacted with methacrylic acids, hydroxyl alkyl methacrylates such as hydroxyethyl and hydroxypropyl methacrylates, as well as amino methacrylates. N-alkylol amides are methacrylamides such as N-methylol methacrylamide, N-ethanol methacrylamide, and similar alkyl methacrylamide monomers containing methyl, ethyl, propyl, n-butyl or isobutyl alkyl groups. Preferred hydroxyl containing monomers are hydroxy containing ethylenically unsaturated monomers such as 2-hydroxyethyl methacrylate and 2-hydroxypropyl methacrylate.

The amount of monofunction methacrylate to be used to modify the methacrylol terminated polyester should be no more than the amount of terminal methacryloyl moieties that are present in the polyester on an equivalent basis. The amount and type of vinyl aromatic monomer present during this end-group modification stage may be different from that used in the polyester forming stage. The amount of vinyl aromatic can advantageously be from about 0 moles vinyl aromatic per equivalents of combined methacrylic moieties to about 2.5 moles per equivalent of combined methacrylic moieties. Thus, the particular distribution of functionality in structure I can be controlled between backbone components and terminating components.

Referring next to the cobalt (II) catalyst complex, this complex is any of a broad family of cobalt catalysts for chain transfer for methacrylic monomers as was disclosed in commonly assigned U.S. Pat. No. 4,547,323 filed Mar. 21, 1984. The catalyst can be based on a complex between cobalt II and a dioxime which comprises a broad class of catalysts active in chain transfer in the free radical polymerization a methacrylic monomer. The dioxime can be any 1,2- or 1,3-dioxime such as, but not limited to the dioximes derived from 2,3-butanedione, 2,3-hexanedione, 2,4-heptanedione, 2,5-dimethyl-3,4-hexanedione, 3-methyl-2,4-hexanedione, 1,2-cyclohexanedione, 3-phenyl-2,4-pentanedione, 2-naphthylglyoxal or camphoroquinone. Additionally, the dioxime can be derived from an aromatic dione such as, but not limited to, 4-chloro-1,2-benzoquinone, 1,2-napthoquinone, 3,7-dimethyl-1,2-napthoquinone, 3-chloro-1,2-napthoquinone, or substituted 1,2-anthraquinones. A basic ligand can also be used to modify the catalyst. These basic ligands can be materials such as pyridine, triphenyl phosphine, or imidazole derivatives.

The catalyst can also be based on cobalt (II) porphorines such as tetraaryl porphorines or tetra alkyl porphorines wherein the alkyl or aryl group may contain various substituents such as halogens, carboxylates, sulfonates, quaternary ammonium groups and the like. Other catalytic complexes of cobalt (II) that are effective in regulating the molecular weight of methacrylic polymerization may be appropriate to the current invention when used at a higher catalyst concentration. Generally, between 0.01% and 0.40% cobalt II complex catalyst is used based on weight of reactants. The precise amount of catalyst depends upon the weight of the ligands and the efficiency of the catalyst toward chain transfer. The co-addition of vinyl aromatics generally will require greater levels of catalyst by 3–5 fold over the analogous reaction without vinyl aromatics.

In accordance with the processes of this invention, dimethacrylic diester can be polymerized reacting the methacrylic derivative monomer in the presence of the cobalt II organic complex catalyst, non-reactive solvent if desired, and a free radical initiator at temperatures between 0° C. and 150° C. Photochemical initiation can be accomplished below 50° C. and lower than 0° if desired. The preferred temperature range is 40° C. to 90° C. as a compromise between heat removal and limiting side reactions that occur at higher temperatures. Specifically, a more linear polyester at higher molecular weight is possible at lower reaction temperature.

Azo initiators are preferred and peroxy type initiators are to be avoided as they poison the Cobalt II catalyst and can lead to gellation. The azo initiators can be neutral or charged and include 2,2-azobis-(4-methoxy-2,4-dimethylvaleronitrile), 2,2-azobis-(2,4-dimethylvaleronitrile), (1-phenylethyl)azodiphenylmethane, 2,2-azobis-(isobutyronitrile), dimethyl2,2-azobis-(isobutyrate), 2,2-azobis-(2-methylbutyronitrile), 1,1-azobis-(1-cyclohexanecarbonitrile), 2,2-azobis-(2,4,4-trimethyl pentane), 2,2-azobis-(2-methylpropane), 2,2-azobis-(N,N-dimethylene isobutyronidine)dihydrochloride, 2,2-azobis-(2-amidnopropane)dihydrochloride, 2,2-azobis-(N,N-dimethyleneisobutyronidine), 4,4-azobis-(4-cyanopentanoic acid), 3,3-azobis-(3cyanobutyrsulfonic acid) and the like. These free radical initiators can be used at levels between 0.1% and 5% based on the weight of reactants.

Batch polymerization can be carried out in a nitrogen flushed reactor under a nitrogen flow. Preferably, the polymerization is carried out in the absence of oxygen or under nitrogen blanket to avoid undesirable interference of oxygen with the Co(II) catalyst. The methacrylic diester, solvent, and initiator can then be charged to the reactor. The catalyst can be formed in-situ by the addition of ligand and a cobalt (II) salt such as the acetate or chloride and hydrates thereof. Preformed porphorin complexes of cobalt can also be used. Semi-continuous polymerizations can also be carried out in a reactor equipped with a stirrer (mechanical or magnetic), thermometer, condenser, and nitrogen inlet. Solvent can be charged to the reactor and flushed thoroughly with nitrogen during upheat.

After polymerization has advanced as far as desired, the addition of inhibitor at 200 to 2000 ppm should be made for those compositions containing terminal methacryloyl moieties. The degree to which the methacryloyl moieties can be used to generate higher molecular weight polyesters is limited by the side reactions of the methacryloyl radical of a chain end with a pendant unsaturation. This side reaction leads to branching and if allowed to proceed to very high consumption of methacrylolyl moieties can lead to gellation. The desired course of reaction is favored by lower reaction temperatures and by limiting conversion to 60–80% of the intial methacryloyl moieties. The addition of monofunctional methacrylics also help to prevent gellation by consuming the reactive terminal methacryloyl moieties.

EXAMPLE 1

Triethylene glycol dimethacrylate, 300 ml., and 2,2-azobis(isobutyronitrile) (AIBN), 3.0 g., were added to a 500 ml flask and thoroughly flushed with nitrogen. Anhydrous cobalt acetate, 0.14 g and dimethylglyoxime, 0.18 g were added followed by 0.30 ml of pyridine. The reaction mixture was heated to 70° C. and held at that temperature for four hours to give a polymer with a number average molecular weight of 745 and a weight average molecular weight of 2260. Molecular weights were determined by GPC (gas permeation chromatography). The resulting polymer was used as a clear coating over a metal substrate and exhibited excellent film integrity properties.

The foregoing description and illustrative example sets forth applicants' invention directed to soluble poly(glutarate) but is not intended to be limited except as defined in the appended claims.

I claim:

1. A process for preparing non-crosslinked polyester polymer having 2,2-dimethyl-4-methylene glutarate structural units in the polymer chain and a weight average molecular weight above about 2,000 which comprises (a) providing a dimethacrylate ester of the formula:

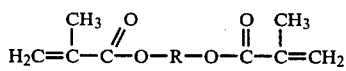

wherein R is selected from the group consisting of an aliphatic chain containing between two and thirty carbon atoms; an aliphatic polyether residue containing between two and thirty carbon atoms; a diepoxide residue; and a low molecular weight hydroxyl-terminated polyester residue; wherein said dimethacrylate ester is the reaction product of about one mole of a diol or diepoxide with about 2 moles of methacrylic acid;

(b) polymerizing said dimethacrylate ester in the presence of at least 0.1% non-peroxide free radical initiator and in the presence of at least 0.01% Cobalt(II) catalyst complex for chain transfer to monomer.

2. The process of claim 1 wherein the diol is a polyether diol.

3. The process of claim 2 wherein the polyether diol is triethylene glycol.

4. The process in claim 1 wherein the Co(II) catalyst is a 1,3-dioxime complex of Co(II).

5. The process in claim 1 wherein the Co(II) catalyst is a 1,2-dioxime complex of Co(II).

6. The process of claim 1 wherein the dimethacrylate ester is the reaction product of a low molecular weight hydroxy-terminated polyester with methacrylic acid.

7. The process of claim 1 wherein the dimethacrylate ester is the reation product of diepoxide and methacrylic acid.

8. A non-crosslinked polyester polymer produced by copolymerizing dimethacrylate esters in accordance with the process of claim 1.

9. A coating comprising the polyester polymer of claim 1.

10. The process of claim 1 wherein the dimethacrylate ester is copolymerized with up to 5 moles vinyl aromatic hydrocarbon monomer per mole of dimethacrylate ester.

11. The process of claim 10 wherein the vinyl monomer is styrene.

12. The process of claim 10 wherein the polymerization is a multi-step polymerization comprising (1) a first-stage wherein the reactants are predominantly dimethacrylate ester with 0 to 5 moles vinyl monomer per mole of dimethacrylate ester; followed by (2) a second-stage polymerization wherein the reactive monomers are methacrylic acid, methacrylic acid esters, methacrylamides and methacrylonitrile.

13. The process of claim 12 wherein the dimethacrylate ester is triethylene glycol dimethacrylate, the vinyl monomeer is styrene, and the second-stage monomer is a lower alkyl ester of methacrylic acid.

* * * * *